(12) United States Patent
Cho et al.

(10) Patent No.: US 11,574,499 B2
(45) Date of Patent: Feb. 7, 2023

(54) APPARATUS WITH FAKE FINGERPRINT DETECTION AND METHOD WITH UPDATING OF MODEL TO PREVENT FAKE FINGERPRINT

(71) Applicant: Samsung Electronics Co., Ltd., Suwon-si (KR)

(72) Inventors: Sung-Jae Cho, Hwaseong-si (KR); Kyuhong Kim, Seoul (KR); Sungun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 17/125,273

(22) Filed: Dec. 17, 2020

(65) Prior Publication Data
US 2021/0365666 A1 Nov. 25, 2021

(30) Foreign Application Priority Data
May 25, 2020 (KR) .......................... 10-2020-0062377

(51) Int. Cl.
*G06V 40/12* (2022.01)
*G06V 40/50* (2022.01)

(52) U.S. Cl.
CPC .......... *G06V 40/1388* (2022.01); *G06V 40/50* (2022.01)

(58) Field of Classification Search
CPC ............... G06V 40/1388; G06V 40/50; G06V 40/1347; G06V 40/1365; G06V 40/1382
See application file for complete search history.

(56) References Cited

U.S. PATENT DOCUMENTS

| | | | |
|---|---|---|---|
| 10,002,242 B2 | 6/2018 | Jakobsson et al. | |
| 10,318,791 B2 | 6/2019 | He et al. | |
| 2010/0061600 A1* | 3/2010 | Niinuma | G06V 40/1394 382/115 |
| 2017/0053108 A1* | 2/2017 | Jakobsson | G06F 21/32 |
| 2017/0220836 A1* | 8/2017 | Phillips | G06K 9/6256 |
| 2019/0050622 A1 | 2/2019 | Cabibihan et al. | |

FOREIGN PATENT DOCUMENTS

| | | |
|---|---|---|
| KR | 10-1938033 B1 | 1/2019 |
| KR | 10-2019-0075560 A | 7/2019 |
| KR | 10-2009000 B1 | 8/2019 |

* cited by examiner

*Primary Examiner* — Abhishek Sarma
(74) *Attorney, Agent, or Firm* — NSIP Law

(57) ABSTRACT

A processor-implemented method includes: obtaining an input embedding vector corresponding to an input fingerprint image for authentication; determining a confidence value of the input embedding vector based on fingerprint data of an initial model including either one or both of a trained real fingerprint determination model and a trained fake fingerprint determination model that are provided in advance; and updating the initial model based on the input embedding vector, in response to the confidence value being greater than or equal to a first threshold.

22 Claims, 15 Drawing Sheets

|  | $x_1$ | $x_2$ | $x_i'$ | $x_4$ | $x_5$ | ... | $x_j$ | | |
|---|---|---|---|---|---|---|---|---|---|
| Hit count of $\theta_{t-1}$ | 4 | 2 | 13 | 42 | 5 | ... | 13.2 | NA | NA |

|  | $x_1$ | $x_2$ | $x_i'$ | $x_4$ | $x_i$ | ... | $x_j$ | | |
|---|---|---|---|---|---|---|---|---|---|
| Time reference of $\theta_{t-1}$ | 96 | 83 | 57 | 35 | 10 | ... | 4 | NA | NA |

|  | $x_1$ | $x_2$ | $x_i'$ | $x_4$ | $x_i$ | ... | $x_j$ | | |
|---|---|---|---|---|---|---|---|---|---|
| $HC_{TR}$ of $\theta_{t-1}$ | 0.04 | 0.02 | 0.2 | 1.2 | 0.5 | ... | 3.3 | NA | NA |

APPARATUS WITH FAKE FINGERPRINT DETECTION AND METHOD WITH UPDATING OF MODEL TO PREVENT FAKE FINGERPRINT

CROSS-REFERENCE TO RELATED APPLICATIONS

This application claims the benefit under 35 USC § 119(a) of Korean Patent Application No. 10-2020-0062377 filed on May 25, 2020 in the Korean Intellectual Property Office, the entire disclosure of which is incorporated herein by reference for all purposes.

BACKGROUND

1. Field

The following description relates to an apparatus with fake fingerprint detection and a method with updating of a model to prevent a fake fingerprint.

2. Description of Related Art

Fingerprint recognition technology has been used for authentication of verification of a device. In general fingerprint recognition, user authentication or verification may be performed by obtaining a fingerprint image of a user through a sensor and comparing the obtained fingerprint image to a pre-registered fingerprint image. When a finely fabricated fake fingerprint pattern is input to the sensor, a fingerprint recognizing apparatus may not distinguish the fake fingerprint pattern from a genuine fingerprint pattern Thus, the fingerprint recognizing apparatus may recognize the fake fingerprint pattern as a biometric fingerprint. For example, when an artificially made, fake fingerprint formed by a material such as rubber, silicon, gelatin, epoxy, and latex on which a fingerprint pattern is engraved makes a contact with the sensor, the fingerprint pattern engraved on such a material may be recognized as a human fingerprint. Distinguishing an artificially made fake fingerprint from a genuine human fingerprint may be important.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes: obtaining an input embedding vector corresponding to an input fingerprint image for authentication; determining a confidence value of the input embedding vector based on fingerprint data of an initial model including either one or both of a trained real fingerprint determination model and a trained fake fingerprint determination model; and updating the initial model based on the input embedding vector, in response to the confidence value being greater than or equal to a first threshold.

The determining of the confidence value of the input embedding vector may include determining the confidence value of the input embedding vector based on the fingerprint data of the initial model and enrolled fingerprint data of an enrollment model.

The method may further include: updating an enrollment model based on the input embedding vector, in response to the confidence value being greater than or equal to a second threshold.

The method may further include: obtaining an enrolled embedding vector corresponding to at least one enrolled fingerprint image for enrollment; and determining the enrolled embedding vector to be the enrolled fingerprint data.

The method may further include: obtaining an enrolled embedding vector corresponding to at least one enrolled fingerprint image for enrollment; determining whether an enrolled fingerprint shown in the at least one enrolled fingerprint image is a real fingerprint, based on the initial model; and determining a fingerprint determined as the real fingerprint among enrolled fingerprints shown in the at least one enrolled fingerprint image to be the enrolled fingerprint data.

The method may further include: obtaining state information using at least one sensor; and determining either one of the initial model and the enrollment model as a model to be updated, based on the state information.

The state information may include information about a scratch state of the at least one sensor, a low-temperature state, or a dry state.

The updating of the initial model may include: determining whether a quantity of the fingerprint data stored in the initial model reaches a storage limit; and determining elimination fingerprint data that is to be excluded from the initial model, in response to the quantity of the fingerprint data stored in the initial model reaching the storage limit.

The determining of the elimination fingerprint data may include: excluding fingerprint data included in the trained fake fingerprint determination model from the elimination fingerprint data; excluding fingerprint data added through the updating from the elimination fingerprint data; and excluding fingerprint data representative of at least one cluster forming the initial model from the elimination fingerprint data.

The fingerprint data may have hit counts. The method may further include adjusting a hit count, among the hit counts, of fingerprint data used in the updating among the fingerprint data. The updating of the initial model may include determining elimination fingerprint data that is to be excluded from the initial model, based on the hit counts.

The updating of the initial model may include determining elimination fingerprint data that is to be excluded from the initial model, based on a time reference of the fingerprint data.

The updating of the initial model may include: determining shift data of which a similarity between the input embedding vector and the fingerprint data is greater than or equal to a third threshold; moving the shift data based on the input embedding vector; and updating the initial model based on the moved shift data.

The fingerprint data may have hit counts. The method may further include adjusting a hit count, among the hit counts, of fingerprint data used in the updating among the fingerprint data. The updating of the initial model may include determining elimination fingerprint data that is to be excluded from the initial model, based on the hit counts time references of the fingerprint data.

In another general aspect, a non-transitory computer-readable storage medium stores instructions that, when executed by a processor, cause the processor to perform the method described above.

In another general aspect, an apparatus includes a processor configured to: obtain an input embedding vector corresponding to an input fingerprint image for authentication, to determine a confidence value of the input embedding vector based on fingerprint data of an initial model including either one or both of a trained real fingerprint determination model and a trained fake fingerprint determination model; and update the initial model based on the input embedding vector, in response to the confidence value being greater than or equal to a first threshold.

The processor may be further configured to determine the confidence value of the input embedding vector based on the fingerprint data of the initial model and enrolled fingerprint data of an enrollment model.

The processor may be further configured to: obtain state information using at least one sensor; and determine either one of the initial model and the enrollment model as a model to be updated, based on the state information.

The processor may be further configured to update an enrollment model based on the input embedding vector, in response to the confidence value being greater than or equal to a second threshold.

The processor may be further configured to: determine whether a quantity of the fingerprint data stored in the initial model reaches a storage limit; and determine elimination fingerprint data that is to be excluded from the initial model, in response to the quantity of the fingerprint data stored in the initial model reaching the storage limit.

The processor may be further configured to: exclude fingerprint data included in the trained fake fingerprint determination model from the elimination fingerprint data; exclude fingerprint data added through the updating from the elimination fingerprint data; and exclude fingerprint data representative of at least one cluster forming the initial model from the elimination fingerprint data.

The fingerprint data may have hit counts. The processor may be further configured to: adjust a hit count, among the hit counts, of fingerprint data used in the updating among the fingerprint data; and determine elimination fingerprint data that is to be excluded from the initial model, based on the hit counts.

The apparatus of claim 13, wherein the processor may be further configured to: determine shift data of which a similarity between the input embedding vector and the fingerprint data is greater than or equal to a third threshold; move the shift data based on the input embedding vector; and update the initial model based on the moved shift data.

The fingerprint data may have hit counts. The processor may be further configured to: adjust a hit count, among the hit counts, of fingerprint data used in the updating among the fingerprint data; determine time reference-modified hit counts by dividing the hit counts by respective time references of the fingerprint data; and determine elimination fingerprint data that is to be excluded from the initial model, based on the time reference-modified hit counts.

The processor may be further configured to determine the elimination fingerprint data to be data, among the fingerprint data, corresponding to a smallest time reference-modified hit count, among the time reference-modified hit counts.

Other features and aspects will be apparent from the following detailed description, the drawings, and the claims.

BRIEF DESCRIPTION OF THE DRAWINGS

FIGS. 5A through 5E illustrate examples of replacing an input embedding vector by elimination fingerprint data or adding an input embedding vector.

Figure 1:
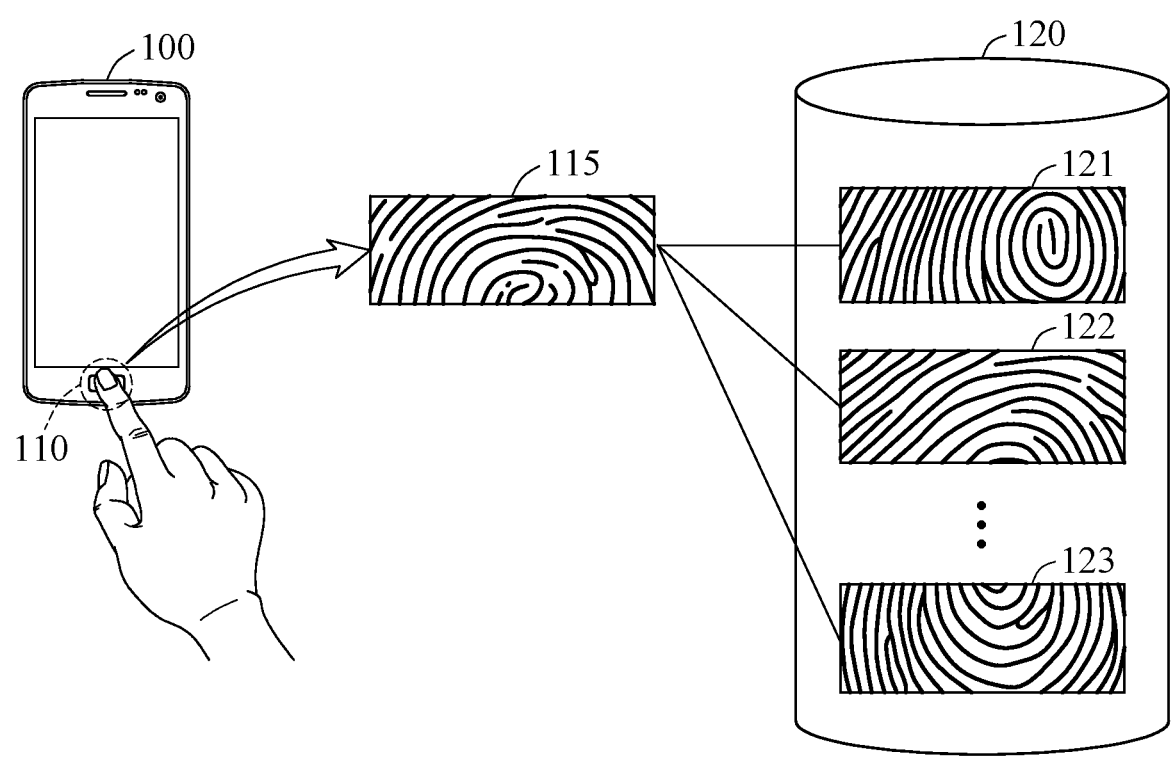
FIG. 1 illustrates an example of biometric information recognition.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Examples disclosed herein may be implemented as various forms of products including, for example, a personal computer (PC), a laptop computer, a tablet computer, a smartphone, a television (TV), a smart home appliance, an intelligent vehicle, a kiosk, or a wearable device.

FIG. 1 illustrates an example of biometric information recognition. In the following description, for convenience of description, biometric information is assumed to be a fingerprint. However, examples described herein may be equally applicable to a variety of biometric information that may be recognized in a form of an image, for example, a vein or an iris.

Referring to FIG. 1, a fingerprint recognition apparatus 100 may include, for example, a fingerprint sensor 110 configured to sense a fingerprint of a user. The fingerprint recognition apparatus 100 may obtain an input fingerprint image 115 representing the fingerprint of the user, using the fingerprint sensor 110.

Fingerprint enrollment may be performed for recognition of a fingerprint. Enrolled fingerprint images 121, 122, and 123 may be stored in advance in an enrolled fingerprint database (DB) 120 through a fingerprint enrollment process. The enrolled fingerprint DB 120 may be stored in a memory included in the fingerprint recognition apparatus 100, or an external device such as a server that may communicate with the fingerprint recognition apparatus 100.

For example, when the fingerprint recognition apparatus 100 receives the input fingerprint image 115 for authentication, the fingerprint recognition apparatus 100 may recognize the fingerprint of the user by comparing a fingerprint (hereinafter, an "input fingerprint") shown in the input fingerprint image 115 to enrolled fingerprints shown in the enrolled fingerprint images 121, 122, and 123.

When a fake fingerprint is sensed in the input fingerprint image 115 and when the input fingerprint image 115 and the enrolled fingerprint image 123 have similar fingerprint patterns, authentication of the fake fingerprint may be likely to succeed. To remedy such an issue of misrecognition, a process of determining whether the input fingerprint in the input fingerprint image 115 is a fake fingerprint or a real fingerprint of a human is required. In an example, the fingerprint recognition apparatus 100 may include an apparatus for detecting a fake fingerprint, hereinafter referred to as a "fake fingerprint detection apparatus," to determine whether the input fingerprint is a fake fingerprint using the fake fingerprint detection apparatus.

A fake fingerprint detection system according to a related art trains a fake fingerprint detector implemented as a neural network, using a training DB that is provided in advance, so that a real fingerprint and a fake fingerprint may be distinguished. Although the fake fingerprint detector is designed based on the training DB in the fake fingerprint detection system according to the related art, covering all actual use environments with the training DB may not be realistic in terms of time and cost.

For example, a case in which it is difficult to cover an actual use environment with the training DB may be a case (hereinafter, a "terminal change case") in which a terminal itself changes, for example, a case in which a protective film is attached to the fake fingerprint detector, or a case in which there is a scratch on the fake fingerprint detector. Another case in which it is difficult to cover an actual use environment with the training DB may be a case (hereinafter, a "fingerprint change case") in which a fingerprint contracts or deforms depending on a use environment (for example, a low temperature, a high temperature, or a dry environment). In the above cases, it may be difficult to cover the actual use environment based on the training DB and, accordingly, a performance of the fake fingerprint detector may decrease.

The fake fingerprint detection apparatus may be updated based on the input fingerprint image 115 for authentication, which will be further described below. The fake fingerprint detection apparatus may be updated based on the input fingerprint image 115, to reflect an actual use environment. Thus, a performance of determining a fake fingerprint may be enhanced.

Figure 2A:
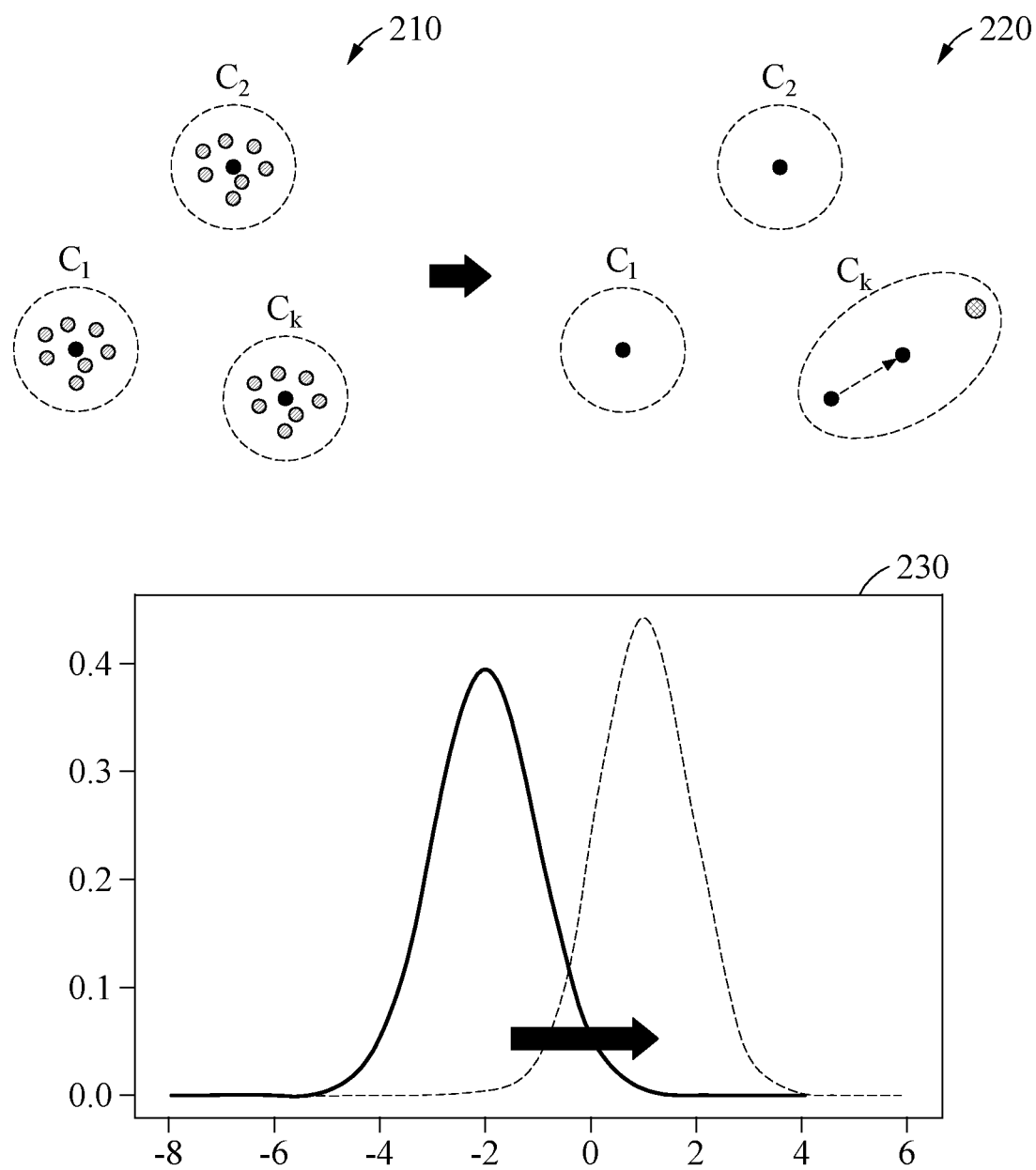
FIG. 2A illustrates an example of a terminal change case.

FIG. 2A illustrates an example of a terminal change case.

Referring to FIG. 2A, a fake fingerprint detection apparatus may update an initial model based on an input fingerprint image, to cover the terminal change case. The terminal change case may be a case in which a terminal itself changes, for example, a case in which a protective film is attached to the fake fingerprint detection apparatus or a case in which there is a scratch on the fake fingerprint detection apparatus, and may indicate that once a change is made, an irreversible change occurs so that it is impossible to return to a previous state.

The initial model may include a real model and a fake model trained to determine whether a fingerprint is a fake fingerprint. The real model may include to a set of embedding vectors corresponding to a real fingerprint training DB in a neural network trained based on a plurality of unspecified fingerprint training DBs prepared in advance. The fake model may include a set of embedding vectors corresponding to a fake fingerprint training DB in a neural network trained based on a plurality of unspecified fingerprint training DBs prepared in advance.

An embedding vector may include information used to distinguish authentication elements, and may include, for example, a component compressed and required for authentication in a fingerprint image. The embedding vector may be referred to as a "feature vector." Since it is impossible for the initial model to reflect all actual use environments of the fake fingerprint detection apparatus, as described above, the initial model may need to be updated based on the actual use environment.

In FIG. 2A, an image 210 shows an initial model that is not updated, and an image 220 shows an updated initial model. Updating of the initial model may include updating fingerprint data included in the initial model. The fingerprint data included in the initial model may include at least one of real fingerprint data of the real model and fake fingerprint data of the fake model. The fingerprint data of the initial model may be an element of the initial model.

In an example, the fingerprint data of the initial model may be one of initial embedding vectors corresponding to all fingerprint images included in an initial fingerprint training DB used to train the initial model. In another example, the fingerprint data of the initial model may be one of a plurality of representative embedding vectors obtained by clustering initial embedding vectors corresponding to all fingerprint images included in an initial fingerprint training DB.

The fake fingerprint detection apparatus may update the initial model based on an input embedding vector corresponding to the input fingerprint image. Referring to a graph 230, in the terminal change case, the entire fingerprint data of the initial model may be updated to be biased toward the input embedding vector corresponding to the input fingerprint image, because the terminal itself changes.

Figure 2B:
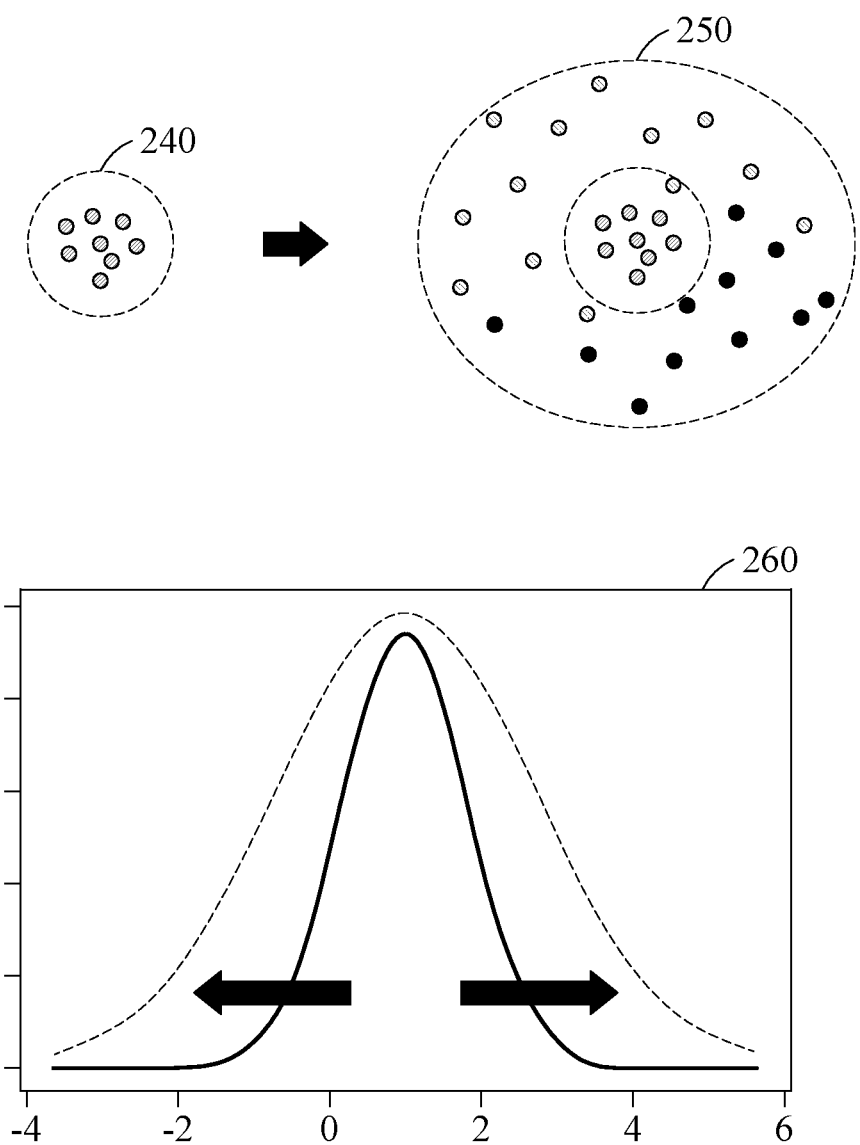
FIG. 2B illustrates an example of a fingerprint change case.

FIG. 2B illustrates an example of a fingerprint change case.

Referring to FIG. 2B, a fake fingerprint detection apparatus may update an enrollment model based on an input fingerprint image to cover the fingerprint change case. The fingerprint change case may be a case in which a fingerprint contracts or deforms depending on a use environment (for example, a low temperature, a high temperature, or a dry environment), as described above, and may indicate a periodic change of a fingerprint in an actual use environment.

The enrollment model may be to a set of enrolled embedding vectors corresponding to, for example, the enrolled fingerprint images 121, 122, and 123 of FIG. 1. Enrolled fingerprint data may be an element of the enrollment model.

The fake fingerprint detection apparatus may generate an enrollment model based on an enrolled fingerprint image that is enrolled for fingerprint authentication. In an example, an enrollment model may be generated under assumption that enrolled fingerprints included in all enrolled fingerprint images are real fingerprints. In another example, an enrollment model may be generated based on a fingerprint determined as a real fingerprint using a trained real fingerprint model and a trained fake fingerprint model.

In an example, the fake fingerprint detection apparatus may obtain an enrolled embedding vector corresponding to an enrolled fingerprint image using a neural network, may determine the enrolled embedding vector as enrolled fingerprint data, and may store the enrolled fingerprint data in an enrolled fingerprint data DB.

In another example, the fake fingerprint detection apparatus may generate an enrollment model based on a fingerprint determined as a real fingerprint using a trained real model and a trained fake model. The fake fingerprint detection apparatus may obtain an enrolled embedding vector corresponding to an enrolled fingerprint image using a neural network, may compare real fingerprint data and the enrolled embedding vector, and may determine a confidence value of the enrolled embedding vector. The fake fingerprint detection apparatus may determine an enrolled embedding vector with a confidence value that is greater than or equal to a predetermined threshold to be enrolled fingerprint data, and may store the enrolled fingerprint data in an enrolled fingerprint data DB.

The fake fingerprint detection apparatus may determine whether an input fingerprint included in the input fingerprint image is a fake fingerprint, based on both the enrolled fingerprint data of the enrollment model and the fingerprint data of the initial model. When it is difficult for the enrollment model to reflect all actual use environments of the fake fingerprint detection apparatus, a performance of the fake fingerprint detection apparatus to determine whether a fingerprint is a fake fingerprint may decrease. Thus, the fake fingerprint detection apparatus may need to update the enrollment model based on the actual use environment.

Referring to FIG. 2B, an image 240 shows an enrollment model that is not updated, and an image 250 shows an updated enrollment model. Updating of the enrollment model may indicate updating fingerprint data included in the enrollment model.

The fake fingerprint detection apparatus may update the enrollment model based on the input embedding vector corresponding to the input fingerprint image. Referring to a graph 260, the enrollment model reflects a predetermined portion of the actual use environment in the fingerprint change case, and accordingly the enrollment model may be updated so that the input embedding vector corresponding to the input fingerprint image may be added to the enrollment model, to cover various actual use environments.

For example, a user may perform enrollment for authentication at room temperature, and accordingly the enrollment model may fail to reflect a fingerprint in a low temperature state, a high temperature state, and a dry state. Thus, the fake fingerprint detection apparatus may perform updating so that the input embedding vector corresponding to the input fingerprint image may be added to the enrollment model.

Figure 3:
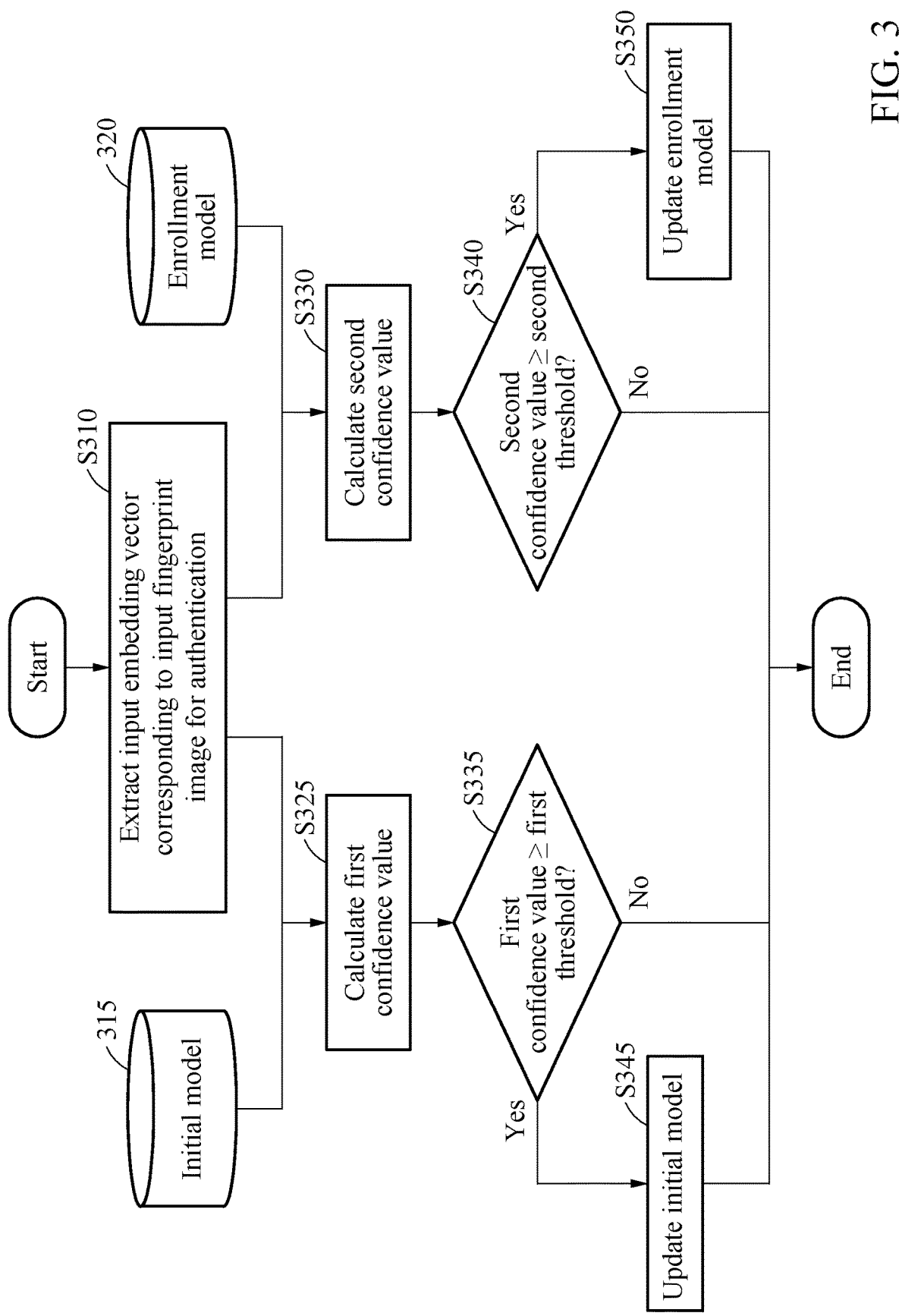
FIG. 3 illustrates an example of updating a model to prevent a fake fingerprint.

FIG. 3 illustrates an example of updating a model to prevent a fake fingerprint.

Referring to FIG. 3, operations S310 through S350 may be performed by the fake fingerprint detection apparatus described above with reference to FIGS. 1 through 2B. The fake fingerprint detection apparatus may be implemented by one or more hardware modules, one or more software modules, or various combinations of hardware modules and software modules.

In operation S310, the fake fingerprint detection apparatus extracts an input embedding vector corresponding to an input fingerprint image for authentication. In an example, the fake fingerprint detection apparatus may receive the input embedding vector from the fingerprint recognition apparatus 100. The fingerprint recognition apparatus 100 may receive the input fingerprint image and may generate the input embedding vector from the input fingerprint image. The input embedding vector may compress a component required for authentication in the input fingerprint image and include the compressed component. In another example, the fake fingerprint detection apparatus may directly receive the input fingerprint image, and may generate the input embedding vector from the input fingerprint image.

In operation S325, the fake fingerprint detection apparatus calculates a first confidence value of the input embedding vector based on fingerprint data of an initial model 315 that is trained to determine whether a fingerprint is a fake fingerprint. The fake fingerprint detection apparatus may calculate the first confidence value of the input embedding vector based on enrolled fingerprint data of an enrollment model 320 in addition to the fingerprint data of the initial model 315.

A confidence value of the input embedding vector may be calculated based on a cosine similarity or a distance between the input embedding vector and any one or any combination of fake fingerprint data, real fingerprint data, and enrolled fingerprint data. Also, various types of similarity calculation schemes may be applied.

For example, the fake fingerprint detection apparatus may calculate the first confidence value of the input embedding vector based on Equation 1 shown below.

$$\beta \frac{\sup_{\theta \in \Theta_{real}} P(x \mid \theta)}{\frac{1}{N} \sum_{\theta_{fake} \in Nbest} P(x \mid \theta_{fake})} + (1-\beta) \frac{\sup_{\theta \in \Theta_{enroll}} P(x \mid \theta)}{\frac{1}{N} \sum_{\theta_{fake} \in Nbest} P(x \mid \theta_{fake})} \quad \text{Equation 1}$$

In Equation 1, $\sup_{\theta \in \Theta_{real}} P(x|\theta)$ is a posterior probability between the input embedding vector and an embedding vector closest to the input embedding vector in the real fingerprint data. $\sup_{\theta \in \Theta_{enroll}} P(x|\theta)$ is a posterior probability between the input embedding vector and an embedding vector closest to the input embedding vector in the enrolled fingerprint data.

$$\frac{1}{N} \sum_{\theta_{fake} \in Nbest} P(x \mid \theta_{fake})$$

is an average value of posterior probabilities between the input embedding vector and a predetermined number (for example, "N") of embedding vectors close to the input embedding vector in the fake fingerprint data. However, a method of calculating the first confidence value of the input embedding vector based on Equation 1 is merely an example, and various schemes may be applied.

In operation S330, the fake fingerprint detection apparatus calculates a second confidence value of the input embedding vector, based on the enrolled fingerprint data of the enrollment model 320, to determine whether a fingerprint is a fake fingerprint. The fake fingerprint detection apparatus may calculate the second confidence value of the input embedding vector based on both the enrolled fingerprint data of the enrollment model 320 and the fingerprint data of the initial model 315. The above-described examples of calculating the first confidence value may also be applicable to calculation of the second confidence value, and the first confidence value may be equal to the second confidence value.

In operation S335, the fake fingerprint detection apparatus determines whether the first confidence value is greater than or equal to a first threshold. If the first confidence value is greater than or equal to the first threshold, the fake fingerprint detection apparatus may update the initial model 315 based on the input embedding vector in operation S345. Examples of updating the initial model based on the input embedding vector will be further described below with reference to FIGS. 4A through 5E.

In operation S340, the fake fingerprint detection apparatus determines whether the second confidence value is greater than or equal to a second threshold. If the second confidence value is greater than or equal to the second threshold, the fake fingerprint detection apparatus may update the enrollment model 320 based on the input embedding vector in operation S350. The first threshold and the second threshold may be different from each other. Examples of updating the enrollment model based on the input embedding vector will be further described below with reference to FIGS. 4A through 5E.

Operations S345 and S350 may be performed simultaneously or in parallel.

Figure 4A:
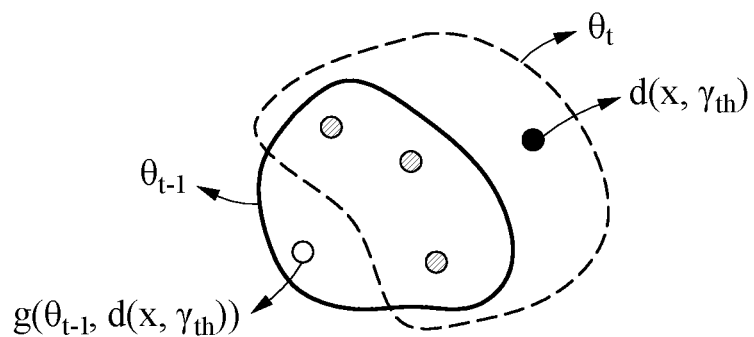
FIGS. 4A and 4B illustrate examples of updating an initial model and an enrollment model based on an input embedding vector.
Figure 4B:
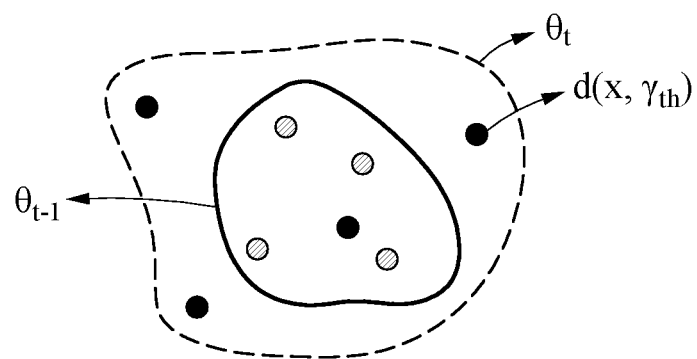

FIGS. 4A and 4B illustrate examples of updating an initial model and an enrollment model based on an input embedding vector.

Referring to FIG. 4A, a fake fingerprint detection apparatus may determine a quantity of fingerprint data stored in an initial model or an enrollment model reaches a storage limit. When the quantity of the fingerprint data stored in the initial model or the enrollment model reaches the storage limit, the fake fingerprint detection apparatus may determine elimination fingerprint data that is to be excluded from a corresponding model. The method of FIG. 4A may be mainly used to update the initial model based on a terminal change case. However, the method of FIG. 4A is not limited to the foregoing example.

Referring to FIG. 4B, when the quantity of the fingerprint data stored in the initial model or the enrollment model does not reach the storage limit, the fake fingerprint detection apparatus may add an input embedding vector to a corresponding model until the quantity of the fingerprint data reaches the storage limit. The method of FIG. 4B may be mainly used to update the enrollment model based on a fingerprint change case. However, the method of FIG. 4B is not limited to the foregoing example.

The above methods of updating the initial model and the enrollment model may be represented as shown in Equation 2 below.

$$\theta_t = \theta_{t-1} \cup \{d(x, \gamma_{th})\} - \{g(\theta_{t-1})\} \quad \text{Equation 2}$$

In Equation 2, $\theta_t$ is an updated initial model or an updated enrollment model, $\theta_{t-1}$ is an initial model or an enrollment model that is not updated, $d(x, \gamma_{th})$ is an input embedding vector having a first confidence value greater than or equal to a first threshold, and $g(\theta_{t-1})$ is elimination fingerprint data.

FIGS. 5A through 5E illustrate examples of replacing an input embedding vector by elimination fingerprint data or adding an input embedding vector.

Figure 5A:
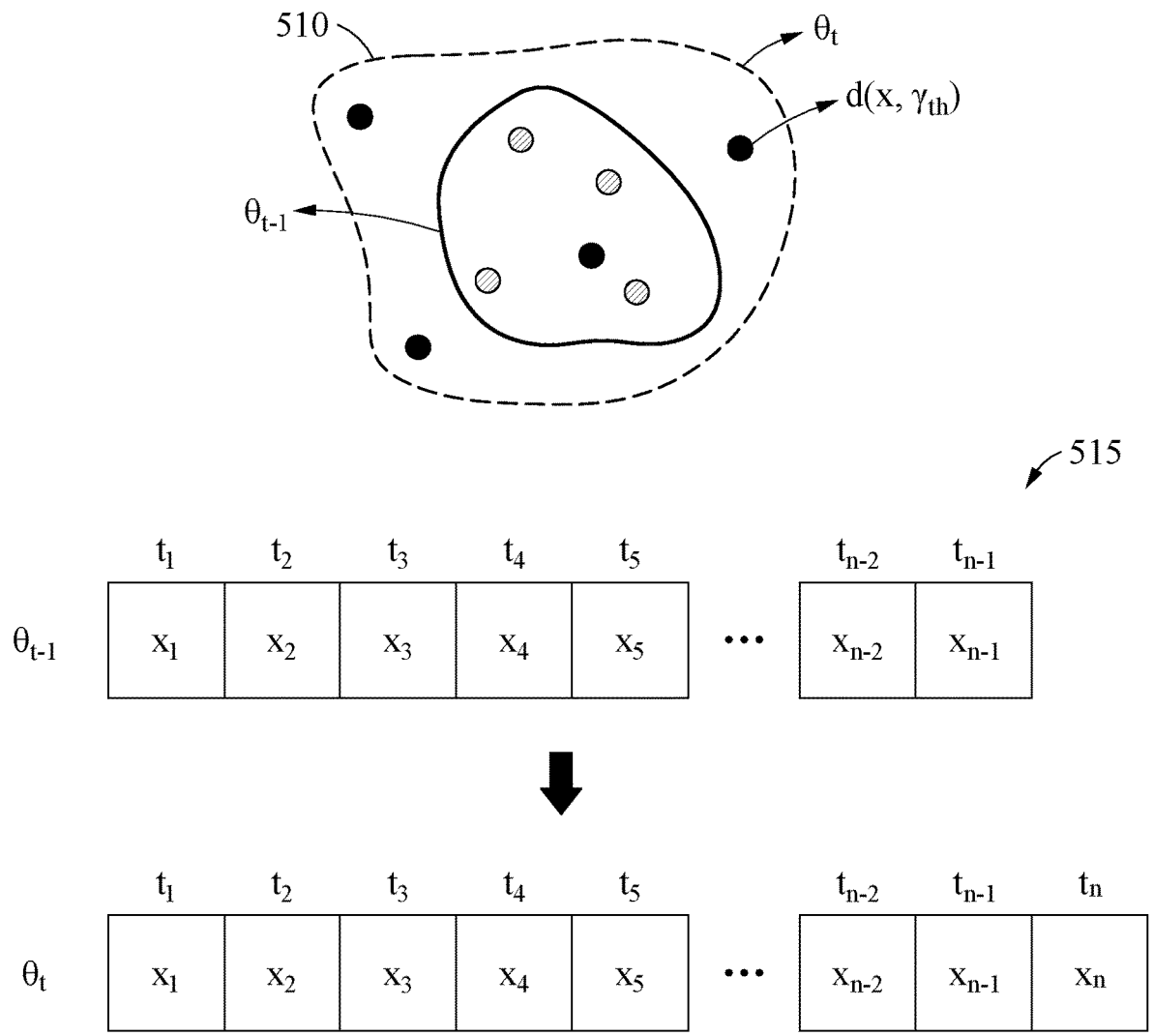

Referring to an image 510 of FIG. 5A, there is no elimination fingerprint data when a quantity of fingerprint data stored in an initial model or an enrollment model does not reach a storage limit, and accordingly a fake fingerprint detection apparatus may add an input embedding vector to a corresponding model. Referring to an image 515, the fake fingerprint detection apparatus may add an input embedding vector $x_n$ corresponding to a time to $t_n$ the initial model or the enrollment model.

Figure 5B:
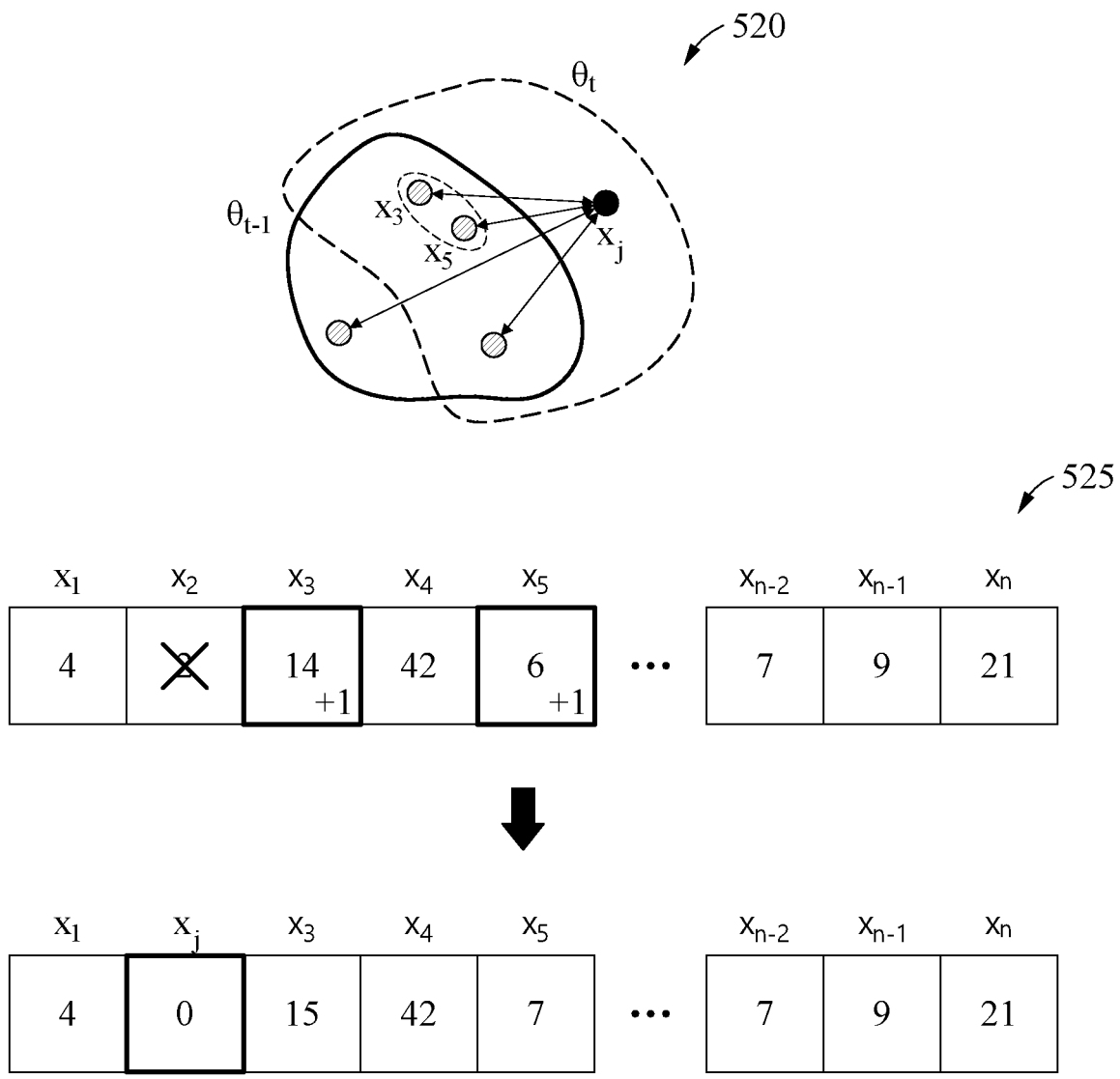

Referring to FIG. 5B, the fake fingerprint detection apparatus may adjust a hit count of fingerprint data used in updating among fingerprint data. For example, when a confidence value of an input embedding vector is determined based on vectors $x_3$ and $x_5$ in an image 520, the fake fingerprint detection apparatus may increase a hit count of the vectors $x_3$ and $x_5$ by "1".

The fake fingerprint detection apparatus may determine, based on the hit count, elimination fingerprint data that is to be excluded from the initial model or the enrollment model. For example, the fake fingerprint detection apparatus may determine a vector $x_2$ having a lowest hit count as elimination fingerprint data in an image 525. The fake fingerprint detection apparatus may remove the elimination fingerprint data $x_2$ from a corresponding model and may add an input embedding vector to the corresponding model.

Figure 5C:
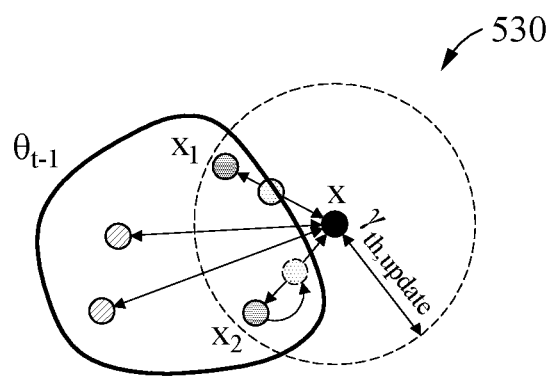
Figure 5C:
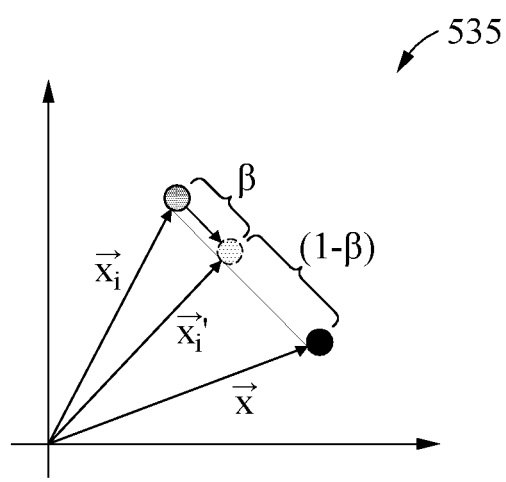

Referring to FIG. 5C, a fake fingerprint detection apparatus may determine shift data of which a similarity between fingerprint data and an input embedding vector is greater than or equal to a third threshold. For example, the fake fingerprint detection apparatus may determine vectors $x_1$ and $x_2$ as shift data in an image 530.

The fake fingerprint detection apparatus may move the shift data based on the input embedding vector. For example, the fake fingerprint detection apparatus may move the shift data based on Equation 3 shown below.

$$\vec{x_i'} = \vec{x_i} + \beta*(\vec{x} - \vec{x_i}) \quad \text{Equation 3}$$

In Equation 3, $\vec{x}$ is an input embedding vector, $\vec{x_i}$ denotes shift data that is not moved, $\vec{x_i'}$ is moved shift data, and $\beta$ is a movement speed adjustment coefficient.

Figure 5D:
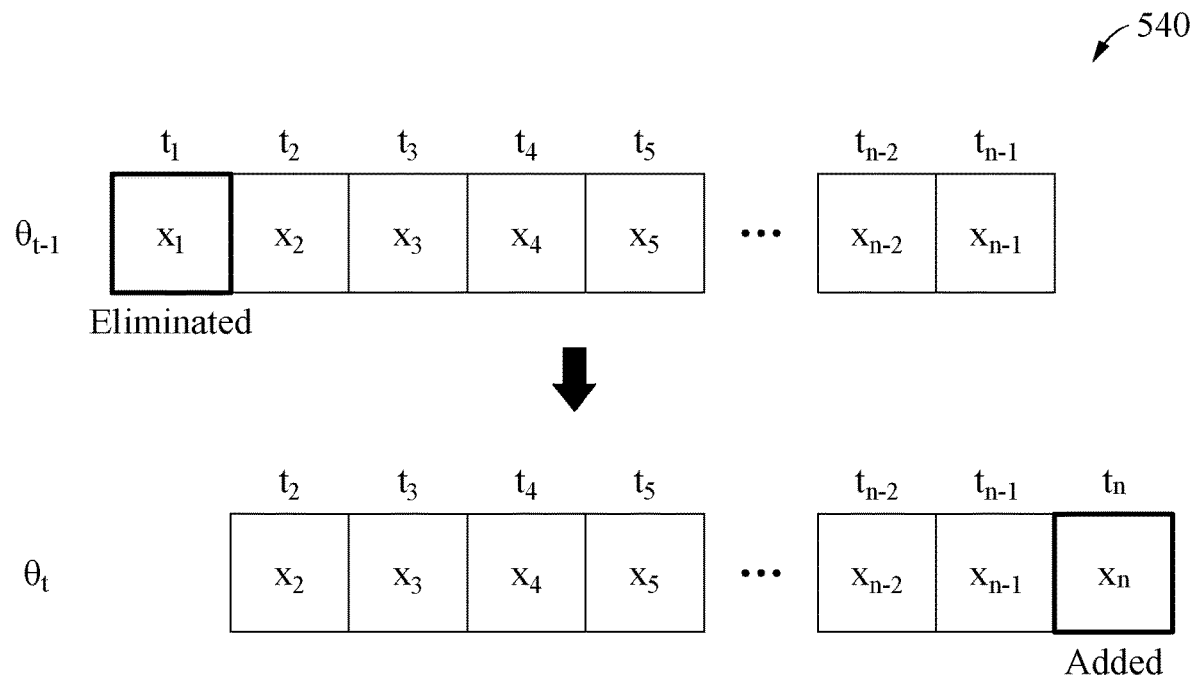

Referring to FIG. 5D, a fake fingerprint detection apparatus may determine elimination fingerprint data that is to be excluded from an initial model or an enrollment model, based on a time reference of fingerprint data. The time reference may include information about a time at which fingerprint data of the initial model or the enrollment model is input, and the fake fingerprint detection apparatus may determine oldest fingerprint data in terms of time as elimination fingerprint data based on the time reference.

For example, in an image 540, the fake fingerprint detection apparatus may determine oldest fingerprint data $x_1$ as elimination fingerprint data, and may add an input embedding vector $x_n$ to the initial model or the enrollment model.

Referring to FIG. 5E, a fake fingerprint detection apparatus may determine elimination fingerprint data that is to be excluded from an initial model or an enrollment model, based on a time reference and a hit count of fingerprint data. For example, the fake fingerprint detection apparatus may determine elimination fingerprint data based on Equation 4 shown below.

$$HC_{TR} = HC(x_i) * \frac{1}{TR(x_i)} \quad \text{Equation 4}$$

In Equation 4, $HC_{TR}$ is a time reference-modified hit count, $HC(x_i)$ is a hit count of fingerprint data $x_i$, and $TR(x_i)$ is a time reference of the fingerprint data $x_i$.

For example, in an image 550, the fake fingerprint detection apparatus may determine $x_1$ having a smallest value obtained by diving a hit count of fingerprint data by a time reference as elimination fingerprint data.

Figure 6:
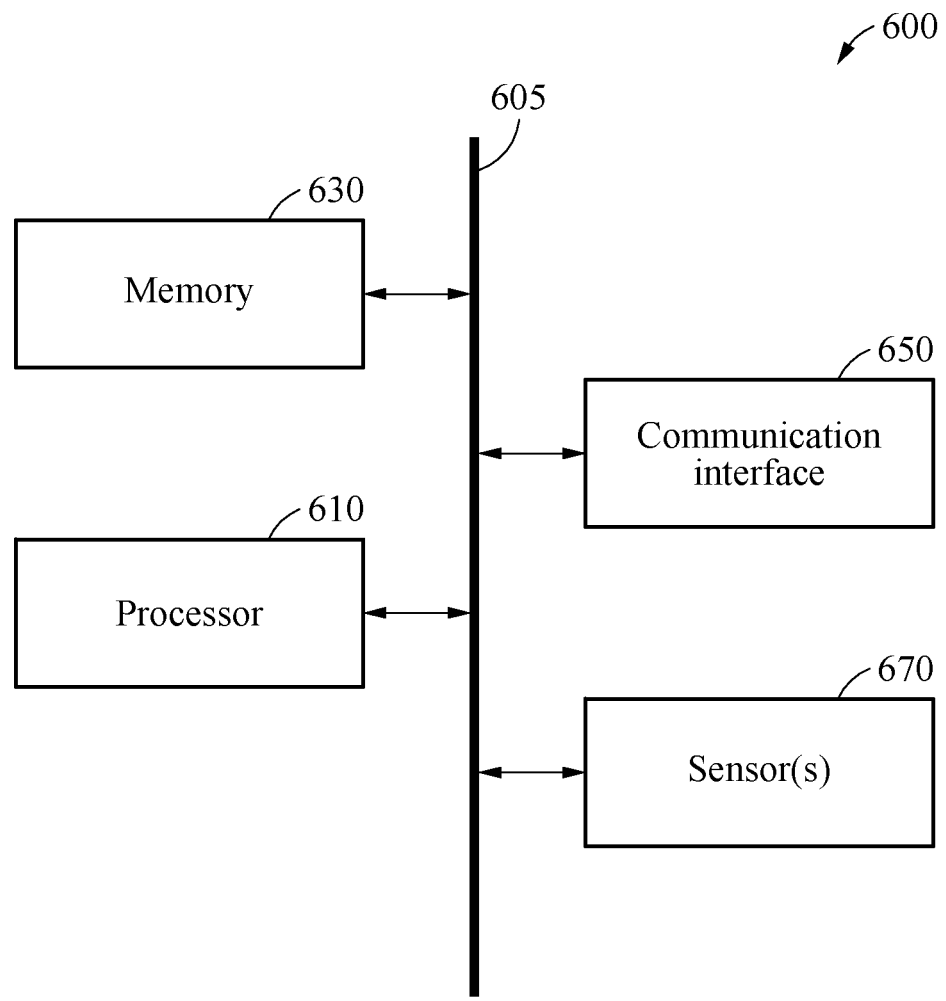
FIG. 6 is a block diagram illustrating an example of a fake fingerprint detection apparatus.

FIG. 6 is a block diagram illustrating an example of a fake fingerprint detection apparatus 600.

Referring to FIG. 6, the fake fingerprint detection apparatus 600 may include a processor 610, for example, a memory 630, a communication interface 650, and sensors 670. The processor 610, the memory 630, the communication interface 650, and the sensors 670 may communicate with each other via a communication bus 605.

The processor 610 may obtain an input embedding vector corresponding to an input fingerprint image for authentication, may determine a confidence value of the input embedding vector based on fingerprint data of an initial model, and may update the initial model based on the input embedding vector when the confidence value is greater than or equal to a first threshold. The initial model may include at least one of a real model and a fake model that are provided in advance.

The memory 630 may include a DB configured to store enrolled fingerprint data, a DB configured to store real fingerprint data, and a DB configured to store fake fingerprint data. The memory 630 may be, for example, a volatile memory, or a non-volatile memory.

The sensors 670 may include, for example, a fingerprint sensor configured to sense a fingerprint of a user.

The processor 610 may determine the confidence value of the input embedding vector based on the fingerprint data of the initial model and enrolled fingerprint data of an enrollment model.

The processor 610 may update the enrollment model based on the input embedding vector when the confidence value is greater than or equal to a second threshold.

The processor 610 may determine whether a quantity of fingerprint data stored in the initial model reaches a storage limit, and may determine elimination fingerprint data that is to be excluded from the input model when the quantity of the fingerprint data stored in the initial model reaches the storage limit.

The processor 610 may exclude, from the elimination fingerprint data, fingerprint data included in the fake model, fingerprint data added through an update, and fingerprint data representative of at least one cluster forming the initial model.

The processor 610 may adjust a hit count of fingerprint data used in an update among fingerprint data, and may determine elimination fingerprint data that is to be excluded from the initial model, based on the hit count.

The processor 610 may determine elimination fingerprint data that is to be excluded from the initial model, based on a time reference of fingerprint data.

The processor 610 may determine shift data of which a similarity between an input embedding vector and fingerprint data is greater than or equal to a third threshold, may move the shift data based on the input embedding vector, and may update the initial model based on the moved shift data.

The processor 610 may obtain state information using at least one sensor, and may determine either one of the initial model and the enrollment model as a model to be updated, based on the state information.

In addition, the processor 610 may perform at least one of the methods described above with reference to FIGS. 1 through 5E or an algorithm corresponding to at least one of the methods. The processor 610 may execute a program, and may control the fake fingerprint detection apparatus 600. Code of the program executed by the processor 610 may be stored in the memory 630. The fake fingerprint detection apparatus 600 may be connected to an external device (for example, a PC or a network) via an input/output device, and may exchange data with the external device. The fake fingerprint detection apparatus 600 may be included in various computing apparatuses and/or systems, for example, a smartphone, a tablet computer, a laptop computer, a desktop computer, a TV, a wearable device, a security system, or a smart home system.

Figure 7:
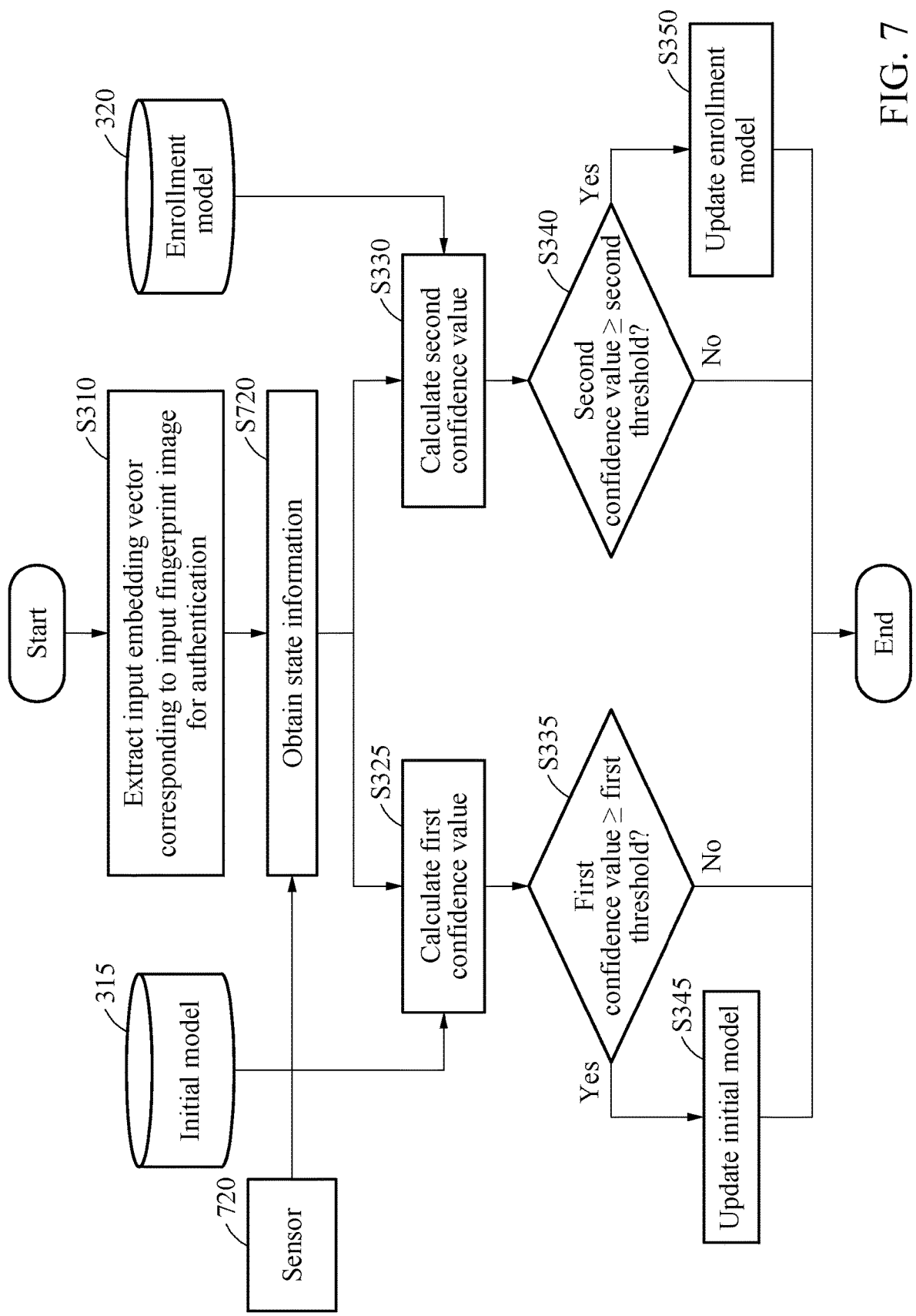
FIG. 7 is a flowchart illustrating an example of determining a model to be updated based on sensor information.

FIG. 7 is a flowchart illustrating an example of determining a model to be updated based on sensor information. The description of FIG. 3 is also applicable to FIG. 7, and thus description overlapping with the description of FIG. 3 is not repeated in the following discussion of FIG. 7.

Referring to FIG. 7, in operation S710, a fake fingerprint detection apparatus obtains state information using at least one sensor 720, and determines either one of an initial model and an enrollment model as a model to be updated, based on the state information.

For example, the fake fingerprint detection apparatus may include a temperature sensor or a fingerprint sensor, may obtain information about a low-temperature state or a dry state using the temperature sensor, and may obtain information about a scratch state using the fingerprint sensor. In an example, when state information of a current input fingerprint image indicating a dry state is obtained in operation S710, the fake fingerprint detection apparatus may proceed to operation S325 to update the initial model. In another example, when state information of a current input fingerprint image indicating a low-temperature state is obtained in operation S710, the fake fingerprint detection apparatus may proceed to operation S330 to update the enrollment model.

FIGS. 8A through 8D illustrate examples of methods of updating an initial model and/or an enrollment model.

Figure 8A:
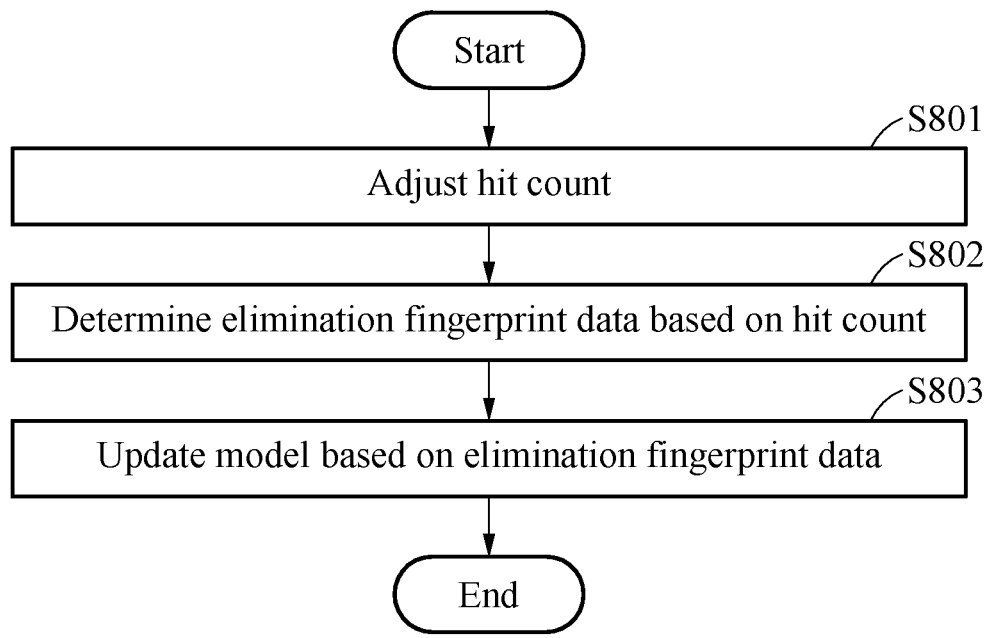
FIGS. 8A through 8D illustrate examples of updating an initial model and/or an enrollment model.

Referring to FIG. 8A, in operation S801, a fake fingerprint detection apparatus adjusts a hit count. In operation S802, the fake fingerprint detection apparatus determines elimination fingerprint data based on the hit count. In operation S803, the fake fingerprint detection apparatus updates a model based on the elimination fingerprint data. The description of FIG. 5B is also applicable to FIG. 8A, and thus further description thereof is not repeated herein.

Figure 8B:
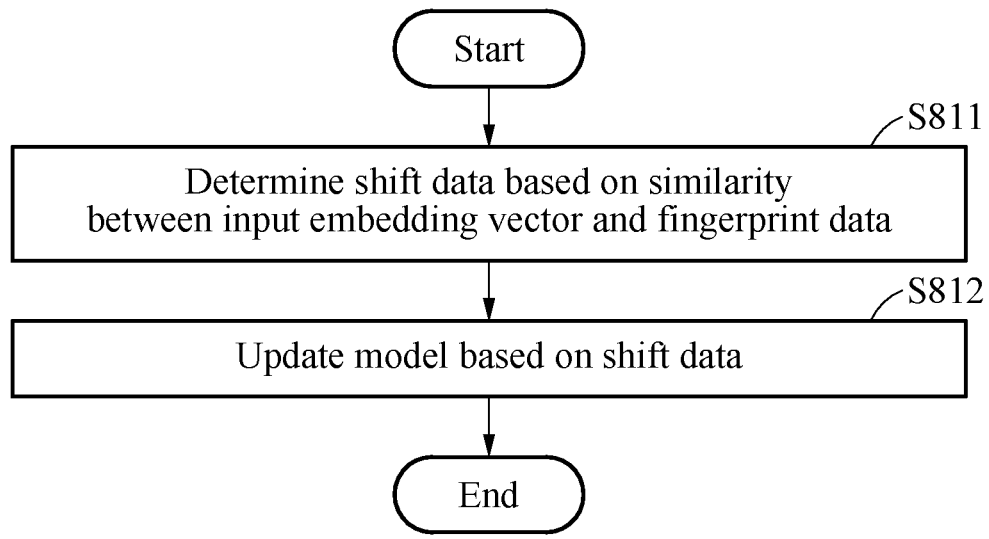

Referring to FIG. 8B, in operation S811, a fake fingerprint detection apparatus determines shift data based on a similarity between an input embedding vector and fingerprint data. In operation S812, the fake fingerprint detection apparatus updates a model based on the shift data. The description of FIG. 5C is also applicable to FIG. 8B, and thus further description thereof is not repeated herein.

Figure 8C:
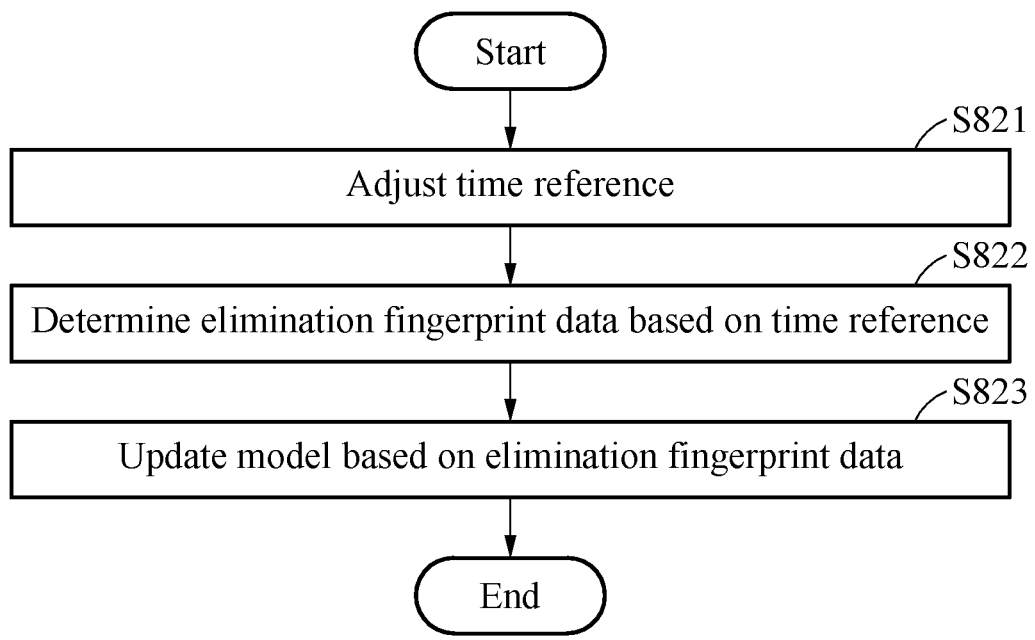

Referring to FIG. 8C, in operation S821, a fake fingerprint detection apparatus adjusts a time reference. For example, the fake fingerprint detection apparatus may calculate a time reference corresponding to input fingerprint data of an initial model or an enrollment model. In operation S822, the fake fingerprint detection apparatus determines elimination fingerprint data based on the time reference. In operation S823, the fake fingerprint detection apparatus updates a model based on the elimination fingerprint data. The description of FIG. 5D is also applicable to FIG. 8C, and thus further description thereof is not repeated herein.

Figure 8D:
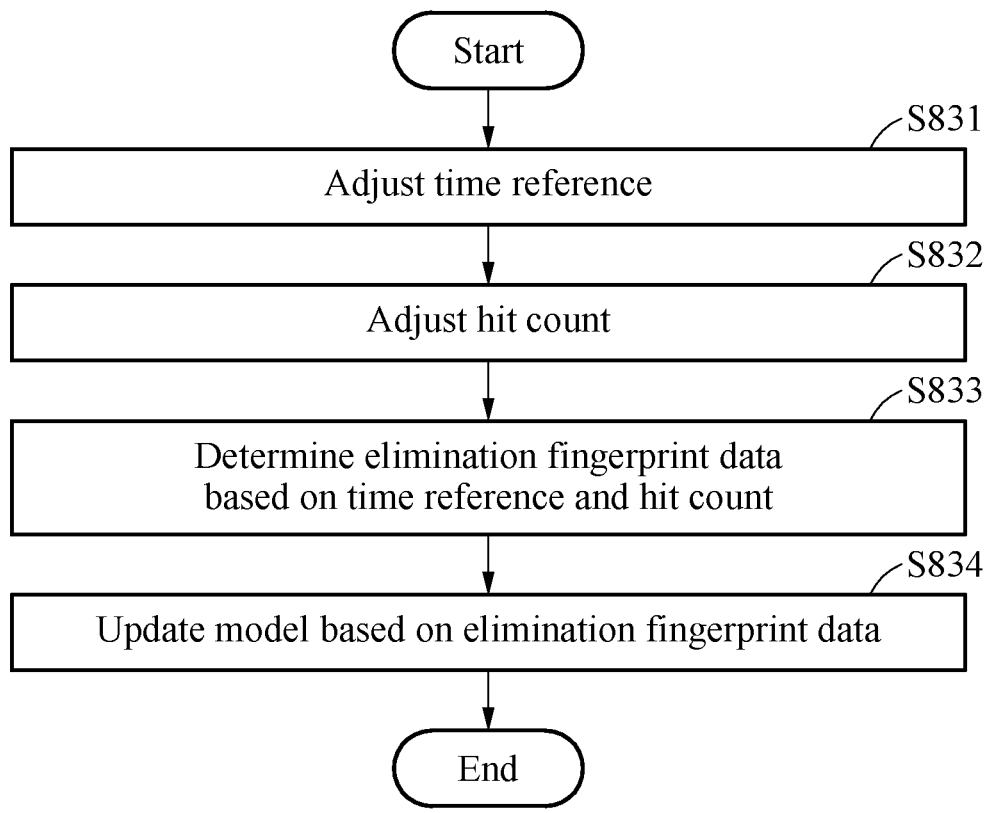

Referring to FIG. 8D, in operation S831, a fake fingerprint detection apparatus adjusts a time reference. In operation S832, the fake fingerprint detection apparatus adjusts a hit count. In operation S833, the fake fingerprint detection apparatus determines elimination fingerprint data based on the time reference and the hit count. In operation S834, the fake fingerprint detection apparatus updates a model based on the elimination fingerprint data. The description of FIG. 5E is also applicable to the example of FIG. 8D, and thus further description thereof is not repeated herein.

Figure 9:
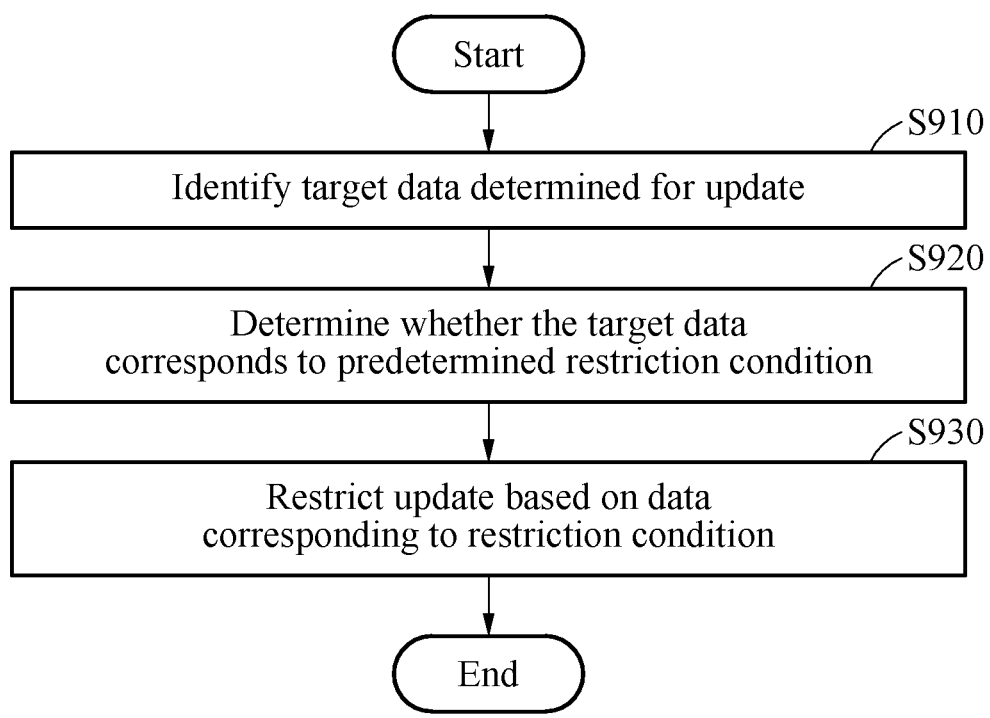
FIG. 9 is a flowchart illustrating an example of an update restriction condition.

FIG. 9 illustrates an example of an update restriction condition.

Referring to FIG. 9, operations S910 through S930 may be performed by the fake fingerprint detection apparatus described above with reference to FIGS. 1 through 8D.

In operation S910, the fake fingerprint detection apparatus identifies target data that is determined for an update. For example, the fake fingerprint detection apparatus may determine shift data or elimination fingerprint data.

In operation S920, the fake fingerprint detection apparatus determines whether the target data corresponds to a predetermined restriction condition. In operation S930, the fake fingerprint detection apparatus restricts a model update based on data corresponding to a restriction condition.

In an example, the fake fingerprint detection apparatus may limit movement and elimination of fingerprint data added through an update. Because a hit count of the fingerprint data added through the update is "0," if the fingerprint data added through the update is not excluded from elimination fingerprint data, the fingerprint data added through the update may be eliminated in a next update. In other words, when the fingerprint data added through the update is eliminated, the meaning of the update is lost. Therefore, the fake fingerprint detection apparatus may delete the fingerprint data added through the update only when an explicit removal request is received.

In another example, the fake fingerprint detection apparatus may limit movement and elimination of fingerprint data included in a fake model. For example, the fake fingerprint detection apparatus may also exclude the fingerprint data included in the fake model from elimination fingerprint data.

In another example, the fake fingerprint detection apparatus may limit movement and elimination of fingerprint data representative of at least one cluster forming an initial model. For example, the fake fingerprint detection apparatus may also exclude the fingerprint data representative of the at least one cluster forming the initial model from elimination fingerprint data.

The neural networks, the fake fingerprint detection apparatus, the initial model 315, the enrollment model 320, the communication bus 605, the processor 610, the memory 630, the communication interface 650, the processors, and the memories in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising: obtaining an input embedding vector corresponding to an input fingerprint image for authentication; determining a confidence value of the input embedding vector based on fingerprint data of an initial model comprising either one or both of a trained real fingerprint determination model and a trained fake fingerprint determination model; and updating the initial model based on the input embedding vector, in response to the confidence value being greater than or equal to a first threshold, wherein the determining of the confidence value of the input embedding vector comprises determining the confidence value of the input embedding vector based on the fingerprint data of the initial model and enrolled fingerprint data of an enrollment model.

2. The method of claim 1, further comprising:
updating an enrollment model based on the input embedding vector, in response to the confidence value being greater than or equal to a second threshold.

3. The method of claim 2, further comprising:
obtaining an enrolled embedding vector corresponding to at least one enrolled fingerprint image for enrollment; and
determining the enrolled embedding vector to be the enrolled fingerprint data.

4. The method of claim 2, further comprising:
obtaining an enrolled embedding vector corresponding to at least one enrolled fingerprint image for enrollment;
determining whether an enrolled fingerprint shown in the at least one enrolled fingerprint image is a real fingerprint, based on the initial model; and determining a fingerprint determined as the real fingerprint among enrolled fingerprints shown in the at least one enrolled fingerprint image to be the enrolled fingerprint data.

5. The method of claim 2, further comprising:
obtaining state information using at least one sensor; and
determining either one of the initial model and the enrollment model as a model to be updated, based on the state information.

6. The method of claim 5, wherein the state information includes information about a scratch state of the at least one sensor, a low-temperature state, or a dry state.

7. The method of claim 1, wherein the updating of the initial model comprises:
determining whether a quantity of the fingerprint data stored in the initial model reaches a storage limit; and
determining elimination fingerprint data that is to be excluded from the initial model, in response to the quantity of the fingerprint data stored in the initial model reaching the storage limit.

8. The method of claim 7, wherein the determining of the elimination fingerprint data comprises:
excluding fingerprint data included in the trained fake fingerprint determination model from the elimination fingerprint data;
excluding fingerprint data added through the updating from the elimination fingerprint data; and
excluding fingerprint data representative of at least one cluster forming the initial model from the elimination fingerprint data.

9. The method of claim 1, wherein the fingerprint data have hit counts,
wherein the method further comprises adjusting a hit count, among the hit counts, of fingerprint data used in the updating among the fingerprint data, and
wherein the updating of the initial model comprises determining elimination fingerprint data that is to be excluded from the initial model, based on the hit counts.

10. The method of claim 1, wherein the updating of the initial model comprises determining elimination fingerprint data that is to be excluded from the initial model, based on a time reference of the fingerprint data.

11. The method of claim 1, wherein the updating of the initial model comprises:
determining shift data of which a similarity between the input embedding vector and the fingerprint data is greater than or equal to a third threshold;
moving the shift data based on the input embedding vector; and
updating the initial model based on the moved shift data.

12. The method of claim 1, wherein the fingerprint data have hit counts,
wherein the method further comprises adjusting a hit count, among the hit counts, of fingerprint data used in the updating among the fingerprint data, and
wherein the updating of the initial model comprises determining elimination fingerprint data that is to be excluded from the initial model, based on the hit counts and time references of the fingerprint data.

13. A non-transitory computer-readable storage medium storing instructions that, when executed by a processor, cause the processor to perform the method of claim 1.

14. An apparatus, comprising: a processor configured to:
obtain an input embedding vector corresponding to an input fingerprint image for authentication, to determine a confidence value of the input embedding vector based on fingerprint data of an initial model comprising either one or both of a trained real fingerprint determination model and a trained fake fingerprint determination model; and update the initial model based on the input embedding vector, in response to the confidence value being greater than or equal to a first threshold, wherein the processor is further configured to determine the confidence value of the input embedding vector based on the fingerprint data of the initial model and enrolled fingerprint data of an enrollment model.

15. The apparatus of claim 14, wherein the processor is further configured to: obtain state information using at least one sensor; and determine either one of the initial model and the enrollment model as a model to be updated, based on the state information.

16. The apparatus of claim 14, wherein the processor is further configured to update an enrollment model based on the input embedding vector, in response to the confidence value being greater than or equal to a second threshold.

17. The apparatus of claim 14, wherein the processor is further configured to:
determine whether a quantity of the fingerprint data stored in the initial model reaches a storage limit; and
determine elimination fingerprint data that is to be excluded from the initial model, in response to the quantity of the fingerprint data stored in the initial model reaching the storage limit.

18. The apparatus of claim 17, wherein the processor is further configured to:
exclude fingerprint data included in the trained fake fingerprint determination model from the elimination fingerprint data;
exclude fingerprint data added through the updating from the elimination fingerprint data; and
exclude fingerprint data representative of at least one cluster forming the initial model from the elimination fingerprint data.

19. The apparatus of claim 14, wherein the fingerprint data have a hit counts, and wherein the processor is further configured to:
adjust a hit count, among the hit counts, of fingerprint data used in the updating among the fingerprint data; and
determine elimination fingerprint data that is to be excluded from the initial model, based on the hit counts.

20. The apparatus of claim 14, wherein the processor is further configured to:
determine shift data of which a similarity between the input embedding vector and the fingerprint data is greater than or equal to a third threshold;
move the shift data based on the input embedding vector; and
update the initial model based on the moved shift data.

21. The apparatus of claim 14, wherein the fingerprint data have hit counts, and wherein the processor is further configured to:
adjust a hit count, among the hit counts, of fingerprint data used in the updating among the fingerprint data;
determine time reference-modified hit counts by dividing the hit counts by respective time references of the fingerprint data; and
determine elimination fingerprint data that is to be excluded from the initial model, based on the time reference-modified hit counts.

22. The apparatus of claim 21, wherein the processor is further configured to determine the elimination fingerprint data to be data, among the fingerprint data, corresponding to a smallest time reference-modified hit count, among the time reference-modified hit counts.

* * * * *